(12) United States Patent
Durand et al.

(10) Patent No.: US 10,843,979 B2
(45) Date of Patent: Nov. 24, 2020

(54) METHOD OF MANUFACTURING MULTI-LAYERED PROPELLANT GRAINS

(71) Applicant: General Dynamics Ordnance and Tactical Systems—Canada Valleyfield Inc., Salaberry-de-Valleyfield (CA)

(72) Inventors: Simon Durand, Montreal (CA); Pierre-Yves Paradis, Salaberry-de-Valleyfield (CA); Daniel Lepage, Coteau-de-Lac (CA)

(73) Assignee: General Dynamics Ordnance and Tactical Systems—Canada Valleyfield Inc., Salaberry-de-Valleyfield (CA)

( * ) Notice: Subject to any disclaimer, the term of this patent is extended or adjusted under 35 U.S.C. 154(b) by 485 days.

(21) Appl. No.: 14/166,622

(22) Filed: Jan. 28, 2014

(65) Prior Publication Data

US 2015/0284301 A1    Oct. 8, 2015

Related U.S. Application Data

(60) Provisional application No. 61/866,748, filed on Aug. 16, 2013.

(51) Int. Cl.
*C06B 21/00* (2006.01)
*C06B 45/12* (2006.01)
(Continued)

(52) U.S. Cl.
CPC ........ *C06B 21/0075* (2013.01); *B29C 48/475* (2019.02); *C06B 25/18* (2013.01); *C06B 45/12* (2013.01)

(58) Field of Classification Search
CPC ... C06B 21/0075; C06B 25/18; C06B 45/105; C06B 45/12; B29C 47/065;
(Continued)

(56) References Cited

U.S. PATENT DOCUMENTS 3,002,459 A    10/1961 Harper
3,166,612 A *  1/1965 Sauer ............... C06B 21/0075
                                                    149/12
(Continued)

FOREIGN PATENT DOCUMENTS

CA    2075738 C    2/2002
GB    2384207 A *  7/2003 ............ B29C 47/28
JP    2000185317 A  7/2000

OTHER PUBLICATIONS

Beckstead et al., Modeling of combustion and ignition of solid-propellant ingredients, 2007, Progress in Energy and Combustion Science, 33.6, Abstract.*

(Continued)

*Primary Examiner* — Joseph S Del Sole
*Assistant Examiner* — Jerzi H Moreno Hernandez
(74) *Attorney, Agent, or Firm* — LKGlobal | Lorenz & Kopf, LLP (57) ABSTRACT

A method of manufacturing a multi-layered propellant grain is provided. The method of the present disclosure simplifies the setup necessary to produce multi-layered propellants by using industrial equipment that is more energy and space efficient than the machinery that is conventionally employed for such processes. The method comprises providing a first propellant formulation; providing a die configured to provide a structure having an outer shell and a hollow interior when material is extruded therethrough; extruding the first propellant formulation through said die, to produce a first propellant layer having an outer shell defining a hollow interior in the form channel having open ends; providing a second propellant formulation, said second propellant formulation being of low viscosity; injecting said second propellant formulation into said channel defined by said first propellant layer to form a second propellant layer disposed (Continued)

in said channel; and hardening said second propellant layer. The first and second propellant layers have different rates of burning.

14 Claims, 5 Drawing Sheets

(51) Int. Cl.
*C06B 25/18* (2006.01)
*B29C 48/475* (2019.01)
(58) Field of Classification Search
CPC ..... B29C 47/0023; B29C 47/40; B29C 47/54; F42B 5/16; F42B 33/00; F42B 33/0271; F42B 33/0264
See application file for complete search history.

(56) References Cited

U.S. PATENT DOCUMENTS

| | | | |
|---|---|---|---|
| 3,194,851 A | 7/1965 | Sauer et al. | |
| 3,599,573 A * | 8/1971 | Sliney | F42B 12/06 102/517 |
| 3,706,278 A | 12/1972 | Stiefel et al. | |
| 3,867,214 A | 2/1975 | Zucker et al. | |
| 3,951,706 A * | 4/1976 | Eldridge | C06B 21/0008 149/104 |
| 4,369,688 A * | 1/1983 | Yunan | C06B 21/0075 102/275.8 |
| 5,129,304 A * | 7/1992 | Loomans | B29C 47/0028 264/150 |
| 5,316,600 A | 5/1994 | Chan et al. | |
| 5,690,868 A | 11/1997 | Strauss et al. | |
| 6,562,276 B1 * | 5/2003 | Shelby | B29C 45/16 264/328.8 |
| 7,063,810 B1 * | 6/2006 | Murphy | C06B 21/0075 264/173.16 |
| 2001/0042578 A1 * | 11/2001 | O'Meara | C06B 21/0066 149/96 |
| 2005/0092166 A1 * | 5/2005 | Worrell, Jr. | B29C 47/0028 86/54 |
| 2008/0018013 A1 * | 1/2008 | Mori | B29B 9/06 264/176.1 |
| 2012/0305083 A1 * | 12/2012 | Dahl | B29C 47/0023 137/1 |
| 2015/0284301 A1 | 10/2015 | Durand et al. | |

OTHER PUBLICATIONS

Nazare et al., Glycidyl azide polymer (GAP)—an energetic component of advanced solid rocket propellants—a review, 1992, Journal of energetic materials, 10.1, Abstract.*
Zebregs et al., Experimental set-up and results of the process of co-extruded perforated gun propellants, 2009, pp. 1-17 (Year: 2009).*
International Bureau of WIPO, International Preliminary Report on Patentability for International Application No. PCT/CA2014/050755, dated Feb. 25, 2016.
Van Driel, Chris A., et al., "Gun Propellant Development Activities in the Netherlands", 23rd International Symposium on Ballistics, Tarragona, Spain (Apr. 16-20, 2007) Accessed on the internet on Oct. 3, 2014; http://www.mater.upm.es/isb2007/Proceedings/PDF/Volume_1/Vol.I(63)IB37.pdf.
Canadian Intellectual Property Office International Searching Authority, International Search Report and Written Opinion for International Application No. PCT/CA2014/050755, dated Oct. 24, 2014.
Zebregs, M. et al., "Experimental set-up and results of the process of co-extruded perforated gun propellants," 2009, retrieved from the internet at http://repository.tudelft.nl/view/tno/uuid%3A26a28769-976f-477f-ac31-9989ff32450d/ on Dec. 9, 2016, Abstract Only.
Paul Braithwaite, "Performance of Co-layered ETPE Propellant in Medium Caliber Ammunition," Apr. 24-28, 2006, 2006 IM/EM Symposium, Bristol, United Kingdom, retrieved from the internet at http://www.imemg.org/wp-content/uploads/imemts2006_Braithwaite_11B.ppt.pdf on Dec. 9, 2016.
Intellectual Property Office of Singapore, Search Report and Written Opinion for Singapore Patent Application No. 11201600999X dated Oct. 27, 2016.
IP Australia, Examination Report on Voluntary Amendments in Australian Patent Application No. 2014306330 dated Feb. 22, 2016.
IP Australia, Examination report No. 1 for standard patent application in Australian Patent Application No. 2014306330 dated Jun. 27, 2017.
European Patent Office, Extended European Search Report in Application No. 14836679.2-1706 dated Mar. 20, 2017.
Japan Patent Office, Notice of Rejection Ground in Japanese Patent Application No. 2016-533759 dated Jan. 9, 2018.
European Patent Office, Communication pursuant to Article 94(3) EPC for Application No. 14 836 679.2-1014 dated Mar. 6, 2018.

* cited by examiner

Ram Press Or Screw Extruder

Pressure Differential Means

METHOD OF MANUFACTURING MULTI-LAYERED PROPELLANT GRAINS

CROSS-REFERENCE TO RELATED APPLICATION

The present application claims the benefit of priority to U.S. Provisional Application Ser. No. 61/866,748, filed on Aug. 16, 2013, the contents of which are herein incorporated by reference in their entirety.

TECHNICAL FIELD

The present disclosure generally relates to a method of manufacturing propellants used in propulsion systems for conventional ammunition.

BACKGROUND

Solid propellants produce hot gases when combusted. The production of hot gases creates pressure that drives propulsion systems for conventional ammunition of all calibers. The pressure generated in a gun tube accelerates projectiles. The objective for obtaining optimal performance is to maximize the projectile acceleration in the gun barrel for as long as possible without surpassing the mechanical failure stress level of the gun barrel. Attempts have been made to achieve a gas generation rate of the gun propellant charge inside the chamber of a gun system to provide optimal performance. One approach is to use a multi-composition propellant composed of multiple burning layers of propellant material combined in such a way that all layers burn sequentially or nearly simultaneously. A slow burning layer ignites and burns first thereby generating gas at a lower rate early on in the ballistic cycle. Next, a faster burning layer ignites in a controlled manner later in the ballistic cycle providing a gas generation rate increase and prolonging the acceleration time of the projectile. Additional layers having differing burning rates may also be provided.

Burning progressivity is an important method of interior ballistic optimization. In modern weapon systems, extremely high performances and muzzle velocities are required to maximize terminal effects for direct fire systems or the range for indirect fire systems. The use of layered propellants to optimize the progressivity is known to be an effective technique. This technique involves structuring a propellant grain using two or more layers of different compositions. The materials are selected and assembled so that each layer burns quasi sequentially. Geometries such as layered sheets having a fast burning layer sandwiched between two sheets of slow burning material have been tested. The layered sheets have been cut in circular stacked sheets, rolled as a scroll or cut in strips. A known process of manufacturing employs two twin screw continuous extruders. These produce layers of each composition using a sophisticated coat hanger die design. Others have employed a single twin screw continuous extruder and have glued the sheets together. Another known technique employs two parallel ram extruders co-extruding the two solid compositions combined in a specific die design. More recently, the technique has been refined using two twin screw extruders connected to a specially designed die which combine the two layers together in a cylinder shaped propellant.

GB 2,384,207 discloses a method for producing an elongate body of energetic material by extruding a first material comprising a viscous intimate mixture of an energetic material and a polymeric binder followed by a moving body of a second material to form a bonded composition of a first material and a second material.

U.S. Pat. No. 3,002,459 discloses multi-layered, perforated propellants for use in rockets a method of preparing using powder compositions compressed to form the perforated propellants.

U.S. Pat. No. 3,706,278 discloses polymeric coatings or films for propellant charge grains to regulate the gas generation schedule of the propellants by manipulating the burning rate of the outer layer and inner core.

U.S. Pat. No. 7,869,989 discloses a process for preparing munitions propellants that are functionally-graded over the cross-sectional area of the propellant. The propellant is formed by forcing a bulk formulation of munitions propellant under pressure through dies or similar piping long enough to stratify by concentration a product with a desirable cross-sectional concentration gradient.

Manufacturing processes currently known in the art for producing multi-layered propellants require complex industrial equipment such as a ram press or a screw extruder for extruding exact layer. This equipment requires the use of a significant amount of space and energy. As result, it is expensive to operate and often difficult to obtain satisfactory results.

There is therefore a need for a method of manufacturing multi-layered propellant grains that utilizes more simple equipment that requires less power, and is smaller than the equipment needed to extrude propellant layers, as required in known manufacturing processes. Further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

A method of manufacturing multi-layered propellants is provided that involves the step of extruding a first layer of a propellant material using conventional machinery such as a ram press or a screw extruder, the first layer being extruded so that the first layer has a hollow interior. Another step of the method is injecting a layer of a lower viscosity propellant material inside the hollow interior by a pressure differential to form a propellant having at least two layers wherein the two layers have differing rates of burning. The injection of the lower viscosity propellant material inside the hollow interior of the first layer may be done at substantially the same time as the first layer is being extruded.

According to one aspect of the disclosure, there is provided a method of manufacturing a multi-layered propellant grain comprising the steps of providing a first propellant formulation; providing a die configured to provide a structure having an outer shell and a hollow interior when material is extruded therethrough; extruding the first propellant formulation through said die to produce a first propellant layer having an outer shell defining a hollow interior in the form of a passageway having open ends; providing a second propellant formulation, said second propellant formulation being of low viscosity; injecting said second propellant formulation into said passageway defined by said first propellant layer to form a second propellant layer disposed in said passageway; and hardening said second propellant layer, wherein the first and second propellant layers have different rates of burning.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The present disclosure is directed to a method of producing multi-layered propellant grains. As a person skilled in the art will appreciate, an optimized performance is achieved for a multi-layered propellant where a maximum operational pressure is obtained upon combustion of a first layer followed by a second maximum operational pressure peak at the maximum operating pressure generated by the subsequent combustion of a second layer that has a faster burning rate than that of the first layer. A characteristic of the optimized performance can be better burning progressivity. The energy transferred in projectile motion is optimized by the maximum pressure maintained during a longer period of time in the barrel. The production of multi-layered propellant grains through co-extrusion techniques can lead to increased muzzle velocity and other outcomes such as flat temperature coefficient where the propellant will generate the same muzzle energy at cold and hot temperature; and insensitivity or decreasing barrel erosion.

The method of the present disclosure simplifies the setup necessary to produce multi-layered propellants by using industrial equipment that is more energy and space efficient than the machinery that is conventionally employed for such processes. The process of the present disclosure includes the step of extruding a first layer of a propellant formulation using conventional machinery such as a ram press or a screw extruder. The first layer is extruded to generate a preferably elongate form that defines a hollow passageway. The method includes a step of injecting a second layer of a lower viscosity propellant formulation inside the passageway defined by the first layer. Preferably, this is achieved by a pressure differential. Preferably, the step of injecting the second layer of a lower viscosity is performed at substantially the same time as the first layer is being extruded. The injection of the second layer can be accomplished by several means including pumps, pressurized vessels, ram press or small screw extruders. These types of equipment require less power and are usually smaller than the equipment needed to extrude conventional propellants. Therefore limited space and infrastructure is required to upgrade existing production processes and associated equipment with this methodology. The low viscosity propellant layer injected by the method of the present disclosure is preferably subsequently hardened by one of several possible means including by cooling, by applying heat, by drying or by polymerization, as discussed in greater detail below.

The method of the present disclosure involves the provision of a first propellant formulation. The first propellant formulation is preferably a relatively slow burning propellant formulation A slow burning propellant formulation can be considered as a formulation known in the art comprising, but not limited to, a single, double, triple or multi-base propellant or a LOVA (low vulnerability ammunition) propellant having a linear burning rate that can vary depending on the application. The slow burning propellant formulation preferably has a burning rate in the range of about 0.1 to about 0.3 meters per second at 200 MPa. An example of an acceptable a relatively slow burning propellant formulation is 55% nitrocellulose and 45% Trimethylolethane trinitrate.

The method of the present disclosure also involves the provision of a second propellant formulation. The second propellant formulation is preferably a relatively fast burning propellant formulation wherein the burning rate is preferably from about 1.5 to about 5 times faster than the slow burning propellant formulation. The fast burning propellant preferably has a burning rate of about 0.15 to about 1 meter per second at 200 MPa. An example of an acceptable a relatively fast burning propellant formulation is 26% GAP (glycidyl azide polymer), 39% TMETN (Trimethylolethane Trinitrate) and 35% RDX (cyclotrimethylene trinitramine).

Prior to the extrusion step described below, the first propellant formulation is processed. The processing step can be carried out by several methods known in the art. For example, processing can be carried out using, but not limited to, twin-screw extrusion, or twin roll mill processing which comprises laminating a propellant dough between two heated rollers to effect mixing and inserting the dough in a ram press for extrusion. A preferred processing method is via a batch mixer where the ingredients of the first propellant formulation are mixed with a blend of solvents selected from the group consisting of a lower alkanol, a $C_2$-$C_6$ aliphatic ether, acetone, a lower alkyl acetate and mixtures thereof, heated and then cooled down while evaporating a large concentration of solvents. The choice of solvents will depend on the desired characteristics of the propellant dough, for example, ethyl acetate can be used when the propellant ingredients are soluble in acetone, and diethyl ether can be used for a quicker heat drying step. More preferably, the solvent is a 50/50 mixture of ethyl alcohol and acetone. The first propellant formulation may preferably be in the form of a paste or other forms such as a gel following processing. Once the paste is ready, it is preferably blocked in cylinders to facilitate extrusion.

Figure 1:
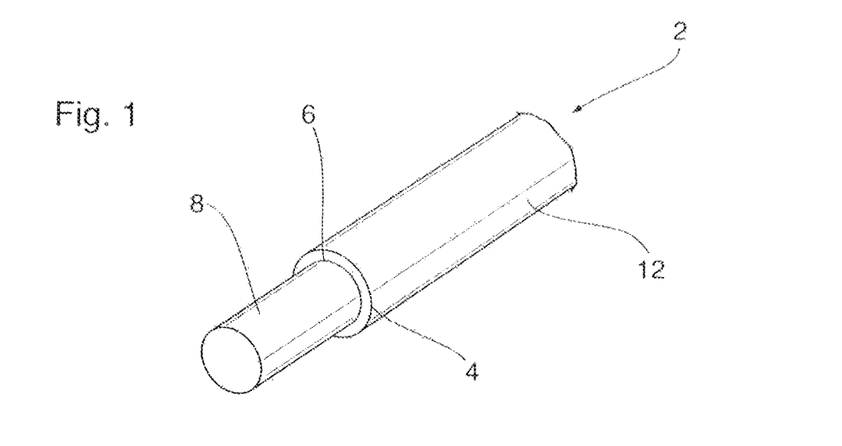
FIG. 1 is a perspective view of an extruded propellant grain of the present disclosure.

The method of the present disclosure includes the step of extruding the first propellant formulation through a die to produce an elongate structure having an outer shell and defining a hollow interior that forms a passageway from a first open end of the structure to a second open end. A preferred multi-layered propellant grain produced by the process of the present disclosure is shown in FIG. 1. The multi-layered propellant grain 2 comprises a first layer 4 having an outer shell 12. Preferably, the first layer 4 is in the form of a hollow tube defining a passageway 6. Many dies known in the art can be used to extrude the first propellant formulation. Such dies may be used in ram extruders and twin screw extruders among others known in the art. As discussed in greater detail below, a second propellant formulation 8 is injected into the passageway 6 to form the multi-layered propellant grain 2. The multi-layered propellant grain 2 preferably has a diameter from about 2 mm to about 10 mm. However the disclosure is not limited to this diameter range. The diameter is dependent on the caliber of the ammunition for which it will be used. For example for a 30 mm GAU8 gun system a diameter of about 3 mm would be appropriate. For a 120 mm tank shell, a diameter of about 8 mm would be appropriate.

The second propellant formulation is provided that is processed such that it has a low viscosity at its extrusion temperature and conditions. For the purposes of the present disclosure, a low viscosity formulation is a formulation that has a viscosity that is in the range of about 0 to about 2000 pascal·seconds at its extrusion temperature and conditions. Preferably, the viscosity is in the range of about 0 to about 500 pascal·seconds at its extrusion temperature and conditions. More preferably the viscosity is in the range of about 0.1 to about 200 pascal·seconds at its extrusion temperature and conditions. And most preferably, the viscosity is in the range of about 5 to about 50 pascal·seconds at its extrusion temperature and conditions. The low viscosity second propellant formulation can be provided in several forms including in the form of a paste, a gel or a liquid.

The second propellant formulation can be processed prior to the injection step described below according to a number of methods known in the art. The second propellant formulation can be mixed, for example, in a planetary mixer, a vertical helical mixer, in a reservoir equipped with an impeller, a rotating barrel, a paint shaker, a sigma blade mixer, a static mixer or a bag mixer. According to a preferred processing method, the ingredients of the second propellant formulation are mixed in a static or planetary mixer under vacuum. Pentaerythritol triacrylate (PETA) may be added to the second propellant formulation minutes before injection, as described below, and mixed thoroughly under vacuum. This chemical starts a polymerizing reaction with GAP. The time of hardening will depend on the concentration of PETA in the mix, as discussed further below.

Figure 2:
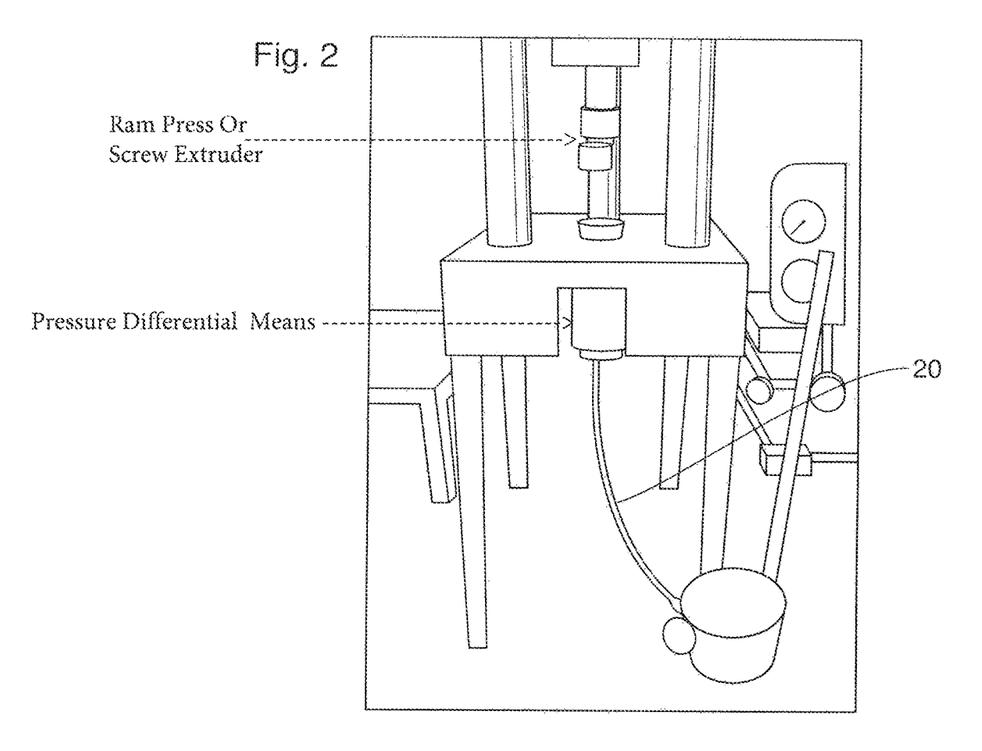
FIG. 2 is a perspective view of equipment used for an extrusion process of the present disclosure.

The process includes the step of injecting the second propellant formulation into the passageway defined by the extruded first propellant layer to form a second propellant layer disposed in the passageway. This step is preferably carried out substantially contemporaneously with the step of extruding the first propellant layer. The first propellant formulation is inserted in the ram press extruder while a vessel containing the second propellant formulation is preferably connected to the extrusion die through tube 20 as shown in FIG. 2. The second propellant formulation can be introduced by positive pneumatic pressure, a small ram press, a screw extruder or a pump, more preferably by cavity pump into the passageway formed through the extrusion of the first propellant layer through the tube 20.

The pressure of the ram press is increased until the first propellant formulation flows into the extrusion die. A pneumatic air pressure is increased in the vessel containing the second propellant formulation until the passageway defined by the first propellant layer is filled simultaneously with the second propellant formulation.

Figure 3:
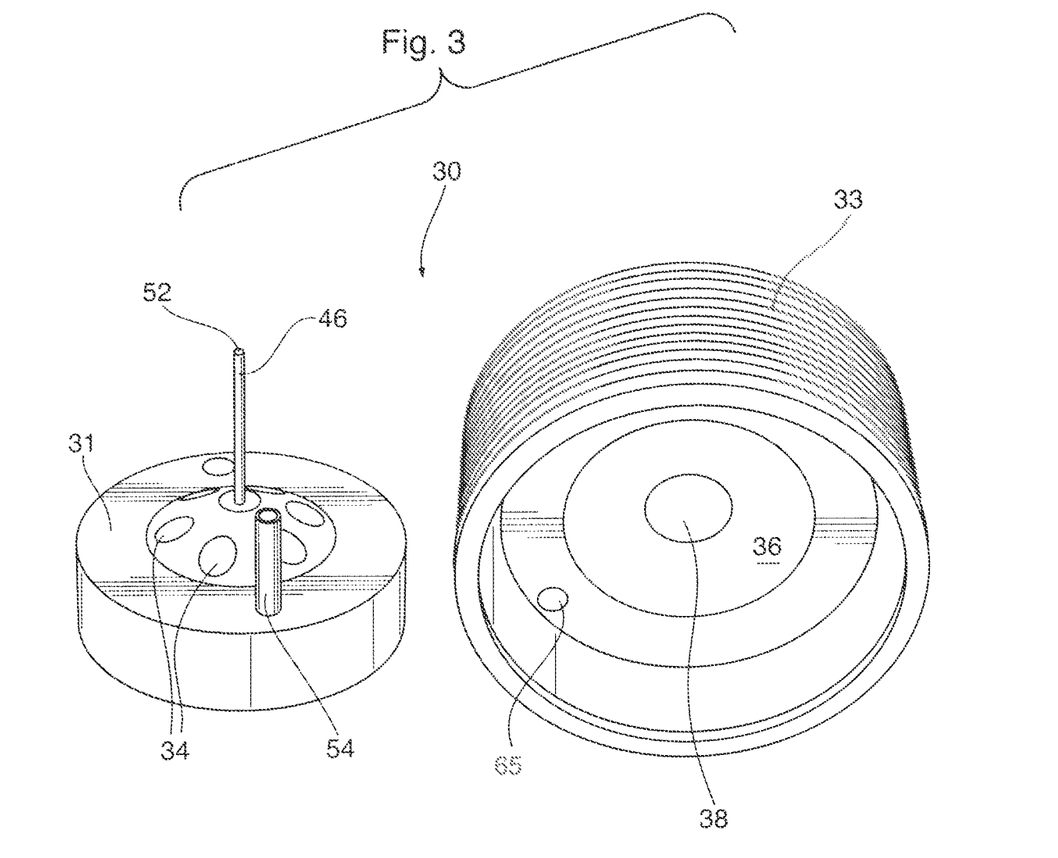
FIG. 3 is an exploded view of the extrusion die of the present disclosure.
Figure 4:
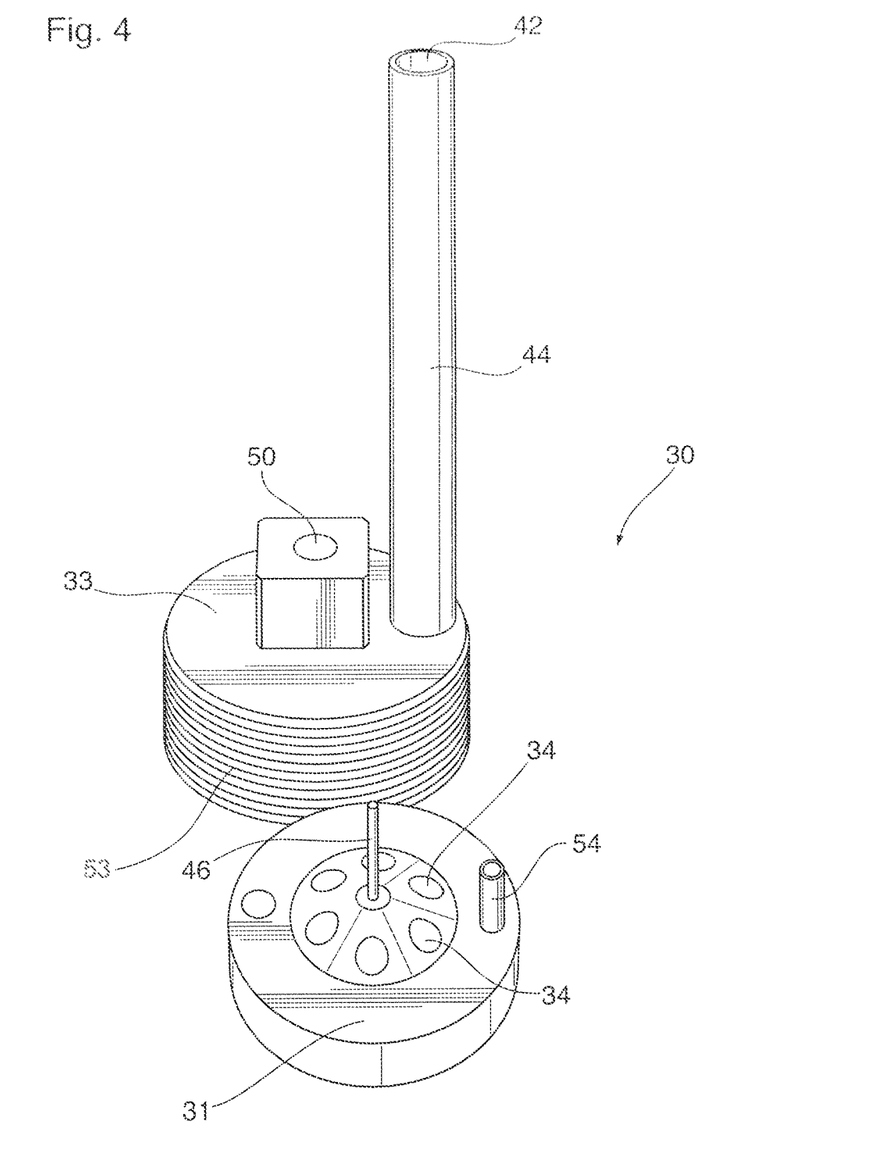
FIG. 4 is a second exploded view of the extrusion die of the present disclosure.

A preferred extrusion die 30 of the present disclosure is shown in FIGS. 3 and 4. The die 30 comprises a first die member 31 that connects to a second die member 33. In alternate embodiments of the present disclosure the die 30 can comprise a single die member where the first member 31 and the second member 33 are integrally formed. The first die member comprises multiple passageways 34 formed therethrough. The first die member 31 further comprises a hollow tube 46 and a receiving tube 54.

Figure 5:
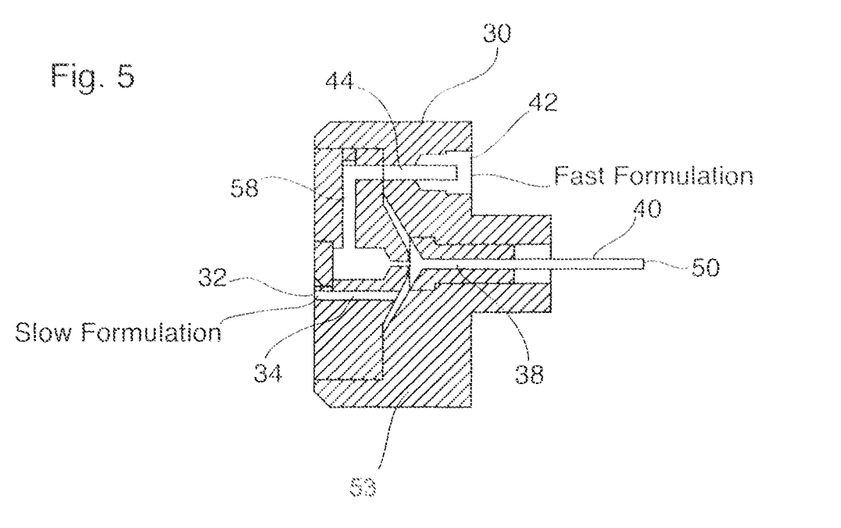
FIG. 5 is a cross section of a modified extrusion die of the present disclosure.

The second die member 33 comprises an opening 38 as shown in FIG. 3 which leads into a tube 46 as shown in FIG. 5. The tube 46 forms a conduit 40 as shown in FIG. 5. The second die member 33 further comprises a hollow tube 44 that defines a conduit. The tube 44 has an opening 42, and the tube 44 connects to an opening 65 of die member 33. The second die member 33 further comprises an opening 50 as shown in FIG. 4. The second die member defines a collecting chamber 36 for receiving a quantity of the first propellant formulation from the passageways 34.

The first die member 31 is received in the second die member 33 When the two die members are connected, tube 46 is received in the passageway 40 through the opening 38. The receiving tube 54 is received in tube 44 through opening 50 to form a continuous passageway therewith.

A preferred method of carrying out the substantially simultaneous extrusion of the first propellant formulation and injection of the second propellant formulation is carried out using the extrusion die 30, a cross section of which is shown in FIG. 5. The extrusion die is shown as installed in ram press 53. The extrusion die 30 defines a plurality of first openings 32 for receiving the first propellant formulation from the ram press a described above. The plurality of openings 32 connects to the passageways 34 which deliver the first propellant formulation to the opening 38 through the collecting chamber 36. The die 30 is configured to create an opening in the extruded material that defines an elongate passageway as the first propellant formulation material moves through conduit 40 and over the tube 46 after having passed through the opening 38 given that the tube 46 is located in the conduit 40.

Figure 6:
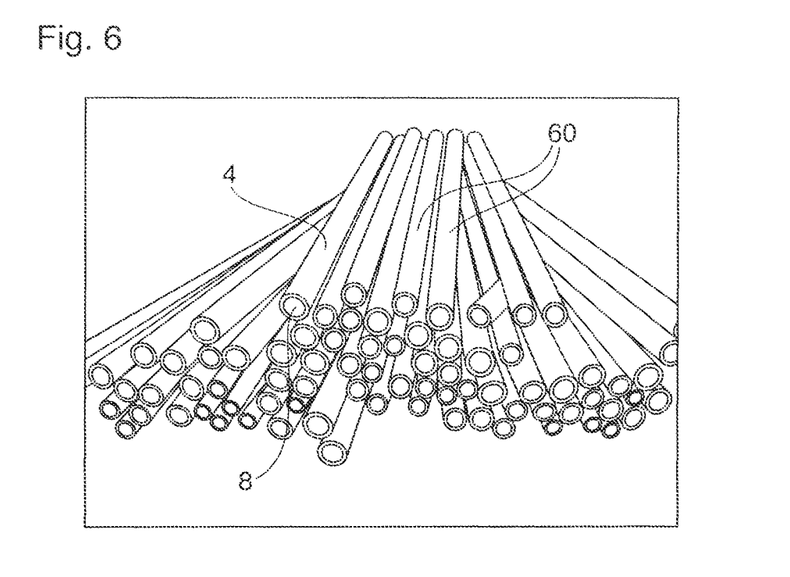
FIG. 6 is a perspective view of a plurality of strings of propellant produced by the method of the present disclosure.

The second propellant formulation is received in opening 42 from the vessel containing the second propellant formulation. The second propellant formulation is pumped into conduit 44 and then through the receiving tube 54 and then into the tube 46 that is connected to the receiving tube 54 through a conduit 58. The conduit 58 connects the tube 54 to the tube 46 via a drilled hole in the first die member 31. This hole is then capped to form a conduit. The tube 46 is positioned such that the first propellant formulation flows around the tube 46 after passing through the opening 38. The tube 46 effectively registers with the opening created in the first propellant layer as the first propellant formulation passes through the opening 38 into the conduit 40. The conduit 40 has a terminal opening 50 and the tube 44 has a terminal opening 52 such that as the first propellant formulation exits opening 50 and the second propellant formulation exits opening 52 a string of propellant 60 is formed as shown in FIG. 6. The propellant comprises an outer layer 4 which is the first propellant layer and an inner layer 8 which is the second propellant layer.

Immediately following the injection of the second propellant layer into the first propellant layer, the second propellant layer is in a state of low viscosity. The second propellant layer is then hardened. Preferably, the second propellant layer is hardened to a viscosity level that prevents undesired flowing of the second propellant layer.

Hardening of the low viscosity second propellant layer is carried out according to any of a number of methods known in the art.

According to one such method, the low viscosity second propellant formulation is softened with a solvent before injection. This solvent can be alcohol, acetone, ether, ethyl acetate, n-heptanes, methanol, ethyl chloride or any solvent compatible with the ingredients used in the formulation. The solvent is removed by evaporation after the second propellant formulation is injected. This prevents the flowing of the injected second propellant formulation.

For example, a second propellant formulation composed of a large quantity of solid energetic such as a nitramine based propellant is mixed with a binder of nitrocellulose and an energetic plasticizer. The mix is softened with a blend of ethyl acetate and alcohol. The injected second propellant layer is subsequently dried in hot water or with a hot air circulation.

Alternatively, where the second propellant formulation is softened by applying heat prior to injection, it may be hardened by subsequent cooling. For example, a highly plasticized second propellant formulation which is a double base composed of nitrocellulose and nitroglycerin may be heated to about 95° C. The mix may then be injected via a single screw press into the first propellant layer. The hardening will occur while the second propellant formulation is cooled.

Another alternative for hardening the second propellant layer, is heating. Some materials such as certain types of nitrocellulose are hardened by applying heat for a period of time. The ingredients of the second propellant formulation are mixed and injected into the first propellant layer and then the multilayered propellant is heated to harden the injected second propellant formulation.

Yet another alternative for the hardening step, is the use of a hardening agent. A hardening agent can be added to the injected second propellant formulation before the shaping of the propellant. This agent will react with one of the ingredients to harden at specific conditions of time and temperature. This hardening agent can reticulate, catalyze a reaction or polymerize the injected formulation.

The resulting propellant has an outer layer which is the slow burning first propellant layer and an inner layer which is the fast burning second propellant layer as shown in FIG. 1. FIG. 6 shows a plurality of strings 60 of propellant produced by the method of the present disclosure that have been stretched and dried following hardening of the second propellant layer.

The propellant is used to drive propulsion systems for conventional ammunition of all calibers. Without being bound by theory, combustion of the first propellant layer creates pressure in the gun tube to accelerate projectiles. The subsequent combustion of the faster burning second propellant layer maintains pressure as volume increases which increases the performance of the propellant.

Figure 7:
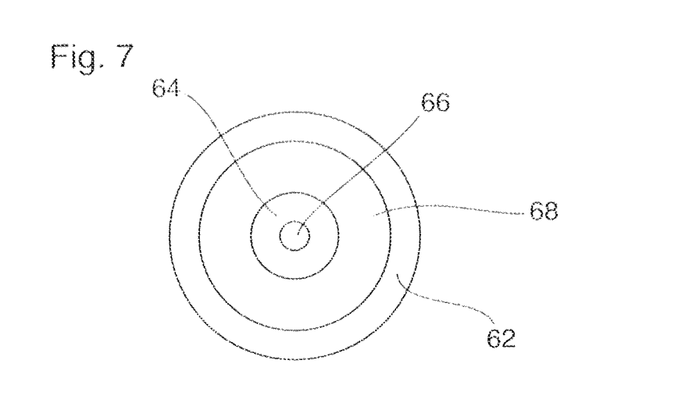
FIG. 7 is a front view of an alternate embodiment of a multi-layered propellant grain produced by the method of the present disclosure.

The method of the present disclosure can also be employed to produce multi-layered propellant grains that have more complex geometries. For example, a perforation 66 can be added in the center of the propellant grain as shown in the FIG. 7. The machinery described herein can extrude an outer layer 62 and an inner layer 64 of a slow burning propellant formulation surrounding the perforation 66 while a fast burning second propellant formulation 68 is injected in a central annular section.

Figure 8:
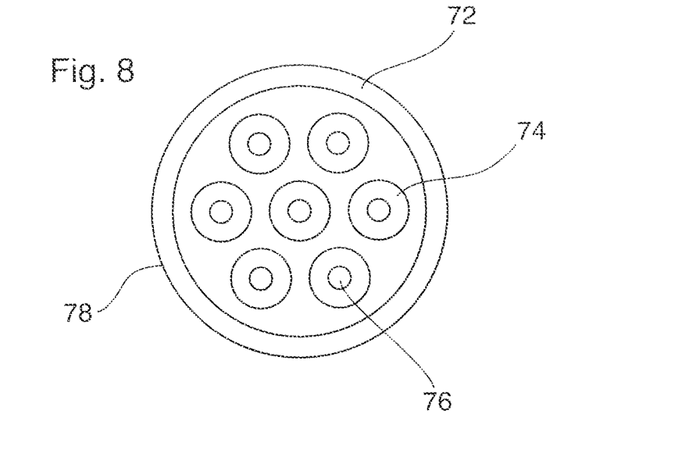
FIG. 8 is a front view of a second alternate embodiment of a multi-layered propellant grain produced by the method of the present disclosure.

Another embodiment of a propellant grain that can be produced according to the method of the present disclosure is shown in FIG. 8. This propellant grain has a co-extruded seven perforation geometry. This type of geometry optimizes the geometric progressivity. The machinery described herein can extrude an outer layer 72 and inner layers 74 of a slow burning propellant formulation, each surrounding a perforation 76 while a fast burning second propellant formulation 78 is injected in a central section among the perforations 76.

Figure 9:
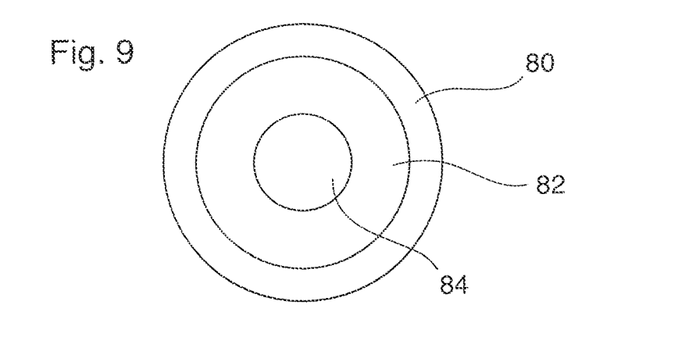
FIG. 9 is a front view of a third alternate embodiment of a multi-layered propellant grain produced by the method of the present disclosure.

Multiple layers can be extruded with different burning rates to increase progressivity and energy density. FIG. 9 shows an example of such a geometry. The propellant grain shown has a first propellant layer 80, a second propellant layer 82 and a third propellant layer 84. Each of these propellant layers has a different rate of burning.

Illustrative Example

The present disclosure is now illustrated by the following non-limiting example. It should be noted that various changes and modifications can be applied to the following example and processes without departing from the scope of this disclosure, which is defined in the appended claims. Therefore, it should be noted that the following example should be interpreted as illustrative only and not limiting in any sense.

The following non-limiting example is provided.

A propellant is provided composed of two concentric cylinders as shown on FIG. 1. The slow burning first propellant layer is composed of 55% nitrocellulose and 45% Trimethylolethane trinitrate (TMETN). It is shaped as a tube and is filled with a fast burning second propellant formulation containing 26% GAP, 39% TMETN and 35% RDX.

The slow burning first propellant formulation is processed via a batch mixer where the ingredients are mixed with a blend of alcohol and acetone, heated and then cooled down while evaporating a large concentration of solvents. Once the dough is ready, it is blocked in cylinders to facilitate extrusion. Meanwhile, the fast burning second propellant formulation ingredients are mixed in a static or planetary mixer under vacuum.

Pentaerythritol triacrylate (PETA) is added to the fast burning second propellant formulation minutes before extrusion and mixed thoroughly under vacuum. This chemical starts a polymerizing reaction with GAP. The time of hardening depends on the concentration of PETA in the mix.

The slow burning first propellant formulation paste is then inserted in the ram press extruder while the static mixer containing the fast formulation is connected to the extrusion die.

From a remote location, the pressure of the ram press is then increased until the slow burning first propellant formulation paste starts to flow in the extrusion die. A pneumatic air pressure is finally increased in the static mixer vessel until a passageway, formed in the slow burning first propellant formulation paste by the die upon extrusion, is filled simultaneously by injection of the fast burning second propellant formulation.

The scope of the claims should not be limited by the preferred embodiments set forth in the description and examples, but should be given the broadest interpretation consistent with the description as a whole.

Further, while at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope as set forth in the appended claims and their legal equivalents.

What is claimed is:

1. A method of manufacturing a multi-layered propellant grain comprising the following steps:
providing a first propellant formulation in the form of a paste;
providing a die configured to produce a structure having an outer shell and a hollow interior when the first propellant formulation is extruded therethrough;
extruding the first propellant formulation through said die using a ram press or screw extruder, to produce a first propellant layer having the outer shell defining the hollow interior in the form of a passageway having open ends;
providing a second propellant formulation, said second propellant formulation being of low viscosity, wherein an as-extruded viscosity of the first propellant formulation exceeds said low viscosity, and wherein said second propellant formulation is of low viscosity such that it has an as-extruded viscosity of from 0.1 to 200 pascal·seconds and is in the form of a liquid or a gel;
injecting said second propellant formulation into said passageway defined by said first propellant layer to form a second propellant layer disposed in said passageway, wherein the injecting of said second propellant formulation is performed such that the second propellant layer comprises a perforation in the center of the second propellant layer, wherein the second propellant formulation has said low viscosity immediately following injection into said passageway, wherein said injecting of said second propellant formulation is performed at the same time as the said extruding of said first propellant formulation and is performed through a pressure differential means selected from the group consisting of: pumps and pressurized vessels, wherein the pressure differential means requires less power and is smaller in size as compared to the ram press or screw extruder; and
after the step of injecting, hardening said second propellant layer such that said second propellant layer achieves a viscosity that is greater than said low viscosity, said greater viscosity being sufficient to prevent flowing of the second propellant layer within said passageway,
wherein the first and second propellant layers have different rates of burning.

2. The method according to claim 1 wherein the first propellant layer is shaped as tube.

3. The method according to claim 2 wherein the propellant grain produced is composed of two concentric cylinders.

4. The method according to claim 1 wherein the first propellant layer is a slow burning layer composed of nitrocellulose and trimethylolethane trinitrate (TMETN).

5. The method according to claim 1 wherein the second propellant layer is a fast burning layer composed of glycidyl azide polymer (GAP), trimethylolethane trinitrate (TMETN) and cyclotrimethylene trinitramine (RDX).

6. The method according to claim 1 comprising the steps of softening said second propellant formulation with a solvent before injecting said second propellant formulation into said passageway and removing said solvent by evaporation after said second propellant formulation is injected into said passageway in order to harden said second propellant layer.

7. The method according to claim 1 comprising the steps of heating said second propellant formulation before injecting said second propellant formulation into said passageway and cooling said second propellant formulation after said second propellant formulation is injected into said passageway in order to harden said second propellant layer.

8. The method according to claim 1 wherein the step of hardening said second propellant layer is carried out by heating said second propellant layer.

9. The method according to claim 1 wherein the step of hardening said second propellant layer is carried out by adding a hardening agent to the second propellant layer.

10. The method according to claim 1 wherein the first propellant layer has a rate of burning of about 0.1 to about 0.3 meters per second at 20011/Pa.

11. The method according to claim 1 wherein the second propellant layer has a rate of burning of about 0.15 to about 1 meter per second at 200 MPa.

12. The method of claim 1, wherein said second propellant formulation is of low viscosity such that it has an as-extruded viscosity of from 5 to 50 pascal·seconds.

13. The method of claim 1 wherein: the first propellant layer is a slow burning layer composed of 55 wt.-% nitrocellulose and 45 wt.-% trimethylolethane trinitrate (TMETN).

14. The method of claim 1 wherein: the second propellant layer is a fast burning layer composed of 26 wt.-% glycidyl azide polymer (GAP), 39 wt.-% trimethylolethane trinitrate (TMETN) and 35 wt.-% cyclotrimethylene trinitramine (RDX).

* * * * *